(12) United States Patent
Sato

(10) Patent No.: US 12,146,828 B2
(45) Date of Patent: Nov. 19, 2024

(54) ROAD-SURFACE STATE DETERMINATION APPARATUS

(71) Applicant: SUBARU CORPORATION, Tokyo (JP)

(72) Inventor: Fumiya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/891,822

(22) Filed: Aug. 19, 2022

(65) Prior Publication Data

US 2023/0078087 A1 Mar. 16, 2023

(30) Foreign Application Priority Data

Sep. 8, 2021 (JP) ................. 2021-145993

(51) Int. Cl.
*G01N 21/359* (2014.01)
*G01N 21/3563* (2014.01)
*G06V 20/56* (2022.01)

(52) U.S. Cl.
CPC ....... *G01N 21/359* (2013.01); *G01N 21/3563* (2013.01); *G06V 20/588* (2022.01)

(58) Field of Classification Search
CPC ............ G01N 21/359; G01N 21/3563; G01N 21/3554; G06V 20/588; G06V 20/59; G06F 2218/12
See application file for complete search history.

(56) References Cited

FOREIGN PATENT DOCUMENTS

| JP | 2006-046936 A | 2/2006 | | |
|---|---|---|---|---|
| JP | 2010-164521 A | 7/2010 | | |
| WO | WO-9634272 A1 | * | 10/1996 | ........... G01N 21/359 |

OTHER PUBLICATIONS

Jonsson et al., Road Surface Status Classification Using Spectral Analysis of NIR Camera Images, 2015, IEEE Sensors Journal, vol. 15, pp. 1641-1656. (Year: 2015).*
Yang, Sen, Quantitative Calibration of Three-Wavelength Road-Condition Sensor Using a Dual-Wavelength Response Ratio, Feb. 7, 2022, IEEE access vol. 10, pp. 16512-16517. (Year: 2022).*
Casselgren et al., Road condition analysis using NIR illumination and compensating for surrounding light, 2016, Optics and lasers in Engineering, vol. 77, pp. 175-182 (Year: 2016).*

* cited by examiner

*Primary Examiner* — Christine S. Kim
(74) *Attorney, Agent, or Firm* — Rimon P.C.

(57) ABSTRACT

A road-surface state determination apparatus performing non-contact determination of a state of a road surface includes one or more processors. The one or more processors control a light source emitting each of three near-infrared lights having respective wavelengths different from one another, thereby cause the three near-infrared lights to be applied from the light source onto the road surface, and cause a light reception sensor to receive the three near-infrared lights reflected by the road surface. The one or more processors perform primary determination as to whether a type of the road surface is a snow accumulated state in precedence over other types on the basis of a light reception result obtained by the light reception sensor, and thereafter perform secondary determination as to which one of the other types the type of the road surface is on the basis of the light reception result.

6 Claims, 8 Drawing Sheets

ROAD-SURFACE STATE DETERMINATION APPARATUS

CROSS-REFERENCE TO RELATED APPLICATIONS

The present application claims priority from Japanese Patent Application No. 2021-145993 filed on Sep. 8, 2021, the entire contents of which are hereby incorporated by reference.

BACKGROUND

The technology relates to a road-surface state determination apparatus configured to perform non-contact determination of a state of a road surface on which a vehicle travels.

A vehicle has excellent convenience for moving. For example, driving an automobile enables visiting various places. In order to further improve safety of driving in such a case, it may be important to accurately determine a state of a road surface in a traveling direction of a vehicle.

For example, Japanese Unexamined Patent Application Publication (JP-A) No. 2006-046936 proposes the following technique. That is, at least three near-infrared lights having respective wavelengths are applied from a light source to a target. The three near-infrared lights having the respective wavelengths include a near-infrared light having a wavelength that is not easily absorbed by either ice or water, a near-infrared light having a wavelength that is not easily absorbed by ice but easily absorbed by water, and a near-infrared light having a wavelength that is absorbed by ice and water at a same level. The near-infrared lights having the respective wavelengths that have been applied onto and reflected by the target are detected. A calculation process is performed with use of amounts of the detected reflected lights, and a road-surface state is thereby determined.

For example, Japanese Unexamined Patent Application Publication (JP-A) No. 2010-164521 proposes the following technique. That is, provided are bandpass filters corresponding to respective lights having particular wavelength bands different from each other. A road condition is determined as one of dry, wet, water-film, freezing, or snow-accumulated on the basis of an output value obtained by applying the respective lights having the particular wavelength bands.

SUMMARY

An aspect of the technology provides a road-surface state determination apparatus configured to perform non-contact determination of a state of a road surface. The road-surface state determination apparatus includes one or more processors and one or more memories communicably coupled to the one or more processors. The one or more processors are configured to control a light source configured to emit each of three near-infrared lights having respective wavelengths different from one another and thereby cause the three near-infrared lights to be applied from the light source onto the road surface. The one or more processors are configured to cause a light reception sensor to receive the three near-infrared lights reflected by the road surface. The one or more processors are configured to perform primary determination as to whether a type of the road surface is a snow accumulated state in precedence over other types on the basis of a light reception result obtained by the light reception sensor. The one or more processors are configured to, after the primary determination, perform secondary determination as to which one of the other types the type of the road surface is on the basis of the light reception result obtained by the light reception sensor.

An aspect of the technology provides a road-surface state determination apparatus configured to perform non-contact determination of a state of a road surface. The road-surface state determination apparatus includes one or more processors and one or more memories communicably coupled to the one or more processors. The one or more processors are configured to control a light source configured to emit each of three near-infrared lights having respective wavelengths different from one another and thereby cause the three near-infrared lights to be applied from the light source onto the road surface. The one or more processors are configured to cause a light reception sensor to receive the three near-infrared lights reflected by the road surface. The one or more processors are configured to determine the state of the road surface from a determination threshold based on a polar coordinates system having axes that represent the respective wavelengths of the three near-infrared lights received by the light reception sensor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Existing techniques including those disclosed in JP-A No. 2006-046936 and JP-A No. 2010-164521 still have room as follows to appropriately meet commercial needs.

For example, the technique disclosed in JP-A No. 2006-046936 determines a state of a road surface with use of three near-infrared lights having respective wavelengths different from one another and is therefore useful in that a road-surface state is determinable in a simple and non-contact manner.

However, it may be important to further improve accuracy in determining a road-surface state to further improve traveling safety of a vehicle. For example, in a case where the state of the road surface is to be determined with use of the three near-infrared lights having different wavelengths, it is difficult to distinguish a wet (WET) state and a freezing (ICE) state. Therefore, desired may be a determination technique that is able to prevent erroneous determination of a road-surface state while still allowing for a simple configuration.

It is desirable to provide a road-surface determination apparatus, for a vehicle, that is able to accurately determine a state of a road surface in a front region in a traveling direction without erroneous determination while suppressing an apparatus cost.

Described below is an example embodiment of the technology. For configurations other than those described below in detail, for example, a publicly-known vehicle structure or a publicly-known vehicle-mounted system including various publicly-known vehicle-mounted sensors may be additionally provided where appropriate.

[Vehicle 200]

Figure 1:
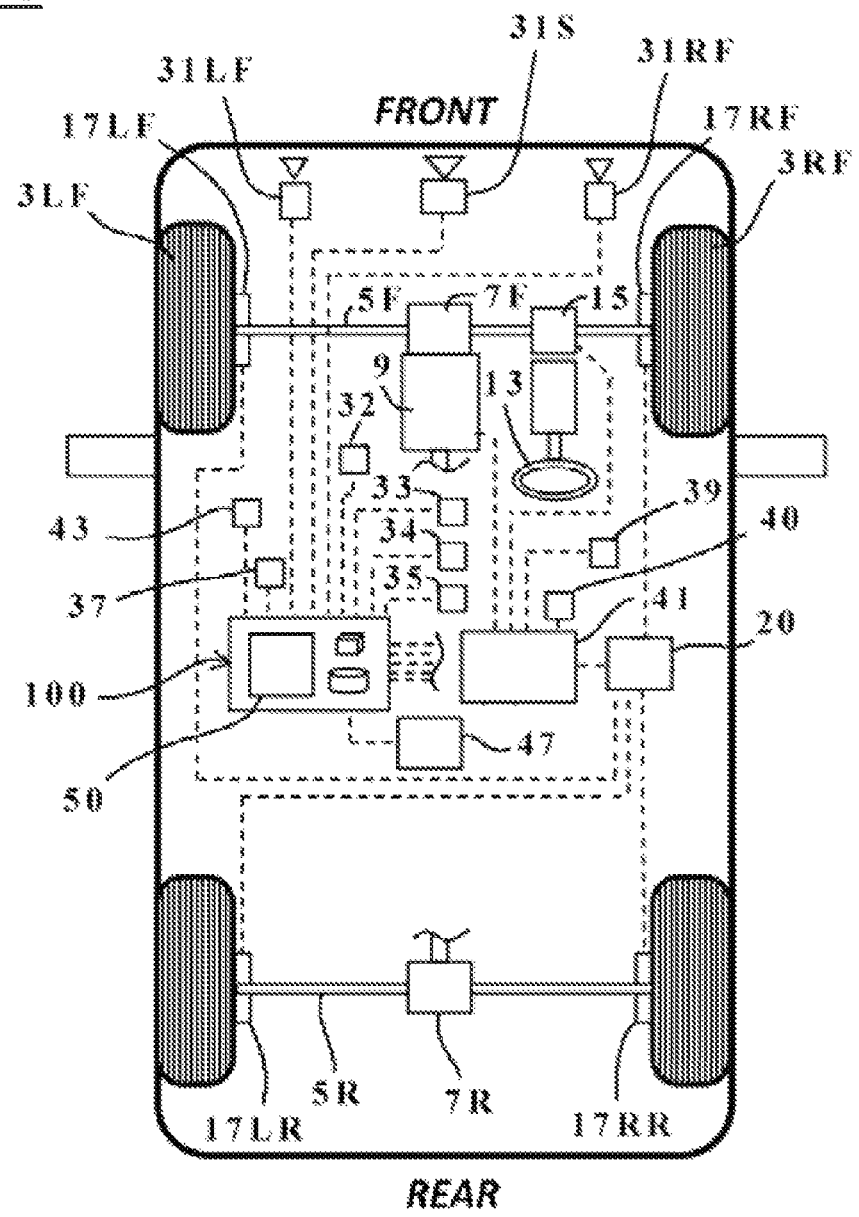
FIG. 1 is a block diagram illustrating a configuration example of a vehicle including a road-surface state determination apparatus according to one example embodiment of the technology.

FIG. 1 illustrates a configuration example of a vehicle 200 of the example embodiment. The following description refers to a four-drive-wheel vehicle as an example of a vehicle applicable to the example embodiment; however, the example embodiment may be applied to a vehicle other than the four-drive-wheel automobile, such as a motorcycle, unless the gist of an embodiment of the technology is affected.

[Overall Configuration of Vehicle]

FIG. 1 is a schematic diagram illustrating the configuration example of the vehicle 200 including a road-surface state determination apparatus 100 according to the example embodiment. The vehicle 200 illustrated in FIG. 1 may be configured as a four-wheel-drive vehicle that transmits driving torque to a left front wheel 3LF, a right front wheel 3RF, a left rear wheel 3LR, and a right rear wheel 3RR (hereinafter collectively referred to as "wheels 3" unless a distinction is to be made between them). The driving torque may be outputted from a driving force source 9 that generates the driving torque of the vehicle 200. The driving force source 9 may be an internal combustion engine or a drive motor, or may include both the internal combustion engine and the drive motor. Non-limiting examples of the internal combustion engine may include a gasoline engine and a diesel engine.

The vehicle 200 may be, for example, an electric vehicle including two drive motors, i.e., a front wheel drive motor and a rear wheel drive motor; or an electric vehicle including drive motors corresponding to the respective wheels 3. In a case where the vehicle 200 is an electric vehicle or a hybrid electric vehicle, the vehicle 200 may be provided with, for example, a secondary battery that stores electric power to be supplied to the drive motor, or an electric power generator that generates electric power to be used to charge the battery. Non-limiting examples of the electric power generator may include a motor and a fuel cell.

As equipment to be used for a driving control of the vehicle 200, the vehicle 200 may include the driving force source 9, an electric steering system 15, and a brake hydraulic control unit 20. The driving force source 9 may output the driving torque to be transmitted to a front-wheel drive shaft 5F and a rear-wheel drive shaft 5R via an unillustrated transmission, a front-wheel differential mechanism 7F, and a rear-wheel differential mechanism 7R. Driving of components including the driving force source 9 and the transmission may be controlled by a vehicle control apparatus 41 including one or more electronic control units (ECUs).

The front-wheel drive shaft 5F may be provided with the electric steering system 15. The electric steering system 15 may include, for example, an unillustrated electric motor and an unillustrated gear mechanism. The electric steering system 15 may be controlled by the vehicle control apparatus 41 to adjust a steering angle of the left front wheel 3LF and the right front wheel 3RF. During manual driving, the vehicle control apparatus 41 may control the electric steering system 15 on the basis of a steering angle of a steering wheel 13 operated by a driver who drives the vehicle 200.

A brake system of the vehicle 200 may be configured as a hydraulic brake system. The brake hydraulic control unit 20 may adjust hydraulic pressure to be supplied to brake calipers 17LF, 17RF, 17LR, and 17RR provided on the left front wheel 3LF, the right front wheel 3RF, the left rear wheel 3LR, and the right rear wheel 3RR, respectively, to thereby generate braking force. Driving of the brake hydraulic control unit 20 may be controlled by the vehicle control apparatus 41. In a case where the vehicle 200 is an electric vehicle or a hybrid electric vehicle, the brake hydraulic control unit 20 may be used in combination with regenerative braking performed using the drive motor.

The vehicle control apparatus 41 may include one or more electronic control units that control driving of the driving force source 9 outputting the driving torque for the vehicle 200, the electric steering system 15 controlling the steering angle of the steering wheel 13 or steered wheels, and the brake hydraulic control unit 20 controlling braking force of the vehicle 200. In one example, the vehicle control apparatus 41 may be configured to control driving of the transmission that changes in speed an output outputted from the driving force source 9 and transmits the output changed in speed to the wheels 3. The vehicle control apparatus 41 may be configured to acquire information transmitted by the road-surface state determination apparatus 100 described later, and to execute a vehicle control based on a result of determination of the state of the road surface performed by the road-surface state determination apparatus 100.

The vehicle 200 may include, for example, a surrounding environment sensor 31, a light reception sensor 32, an occupant monitoring sensor 33, a biosensor 34, a vehicle state sensor 35, a global positioning system (GPS) sensor 37, a vehicle-to-vehicle communication unit 39, a navigation system 40, a human machine interface (HMI) 43, and a light source 47. The light source 47 may be configured to apply each of three near-infrared lights having respective wavelengths different from one another onto the road surface.

Among the above components, the surrounding environment sensor 31 may include a road-surface temperature sensor detecting a temperature of a road surface, an unevenness detection sensor configured to detect unevenness of a road surface, and a moisture amount sensor configured to detect a moisture amount of a road surface, which will be described later. As the sensor detecting the temperature of the road surface, any of various publicly-known temperature sensors may be applied. Non-limiting examples of such a publicly-known temperature sensor may include the one disclosed in Japanese Unexamined Patent Application Publication No. 2015-038516. As the unevenness detection sensor configured to detect unevenness of a road surface, for example, applied may be a device (a road-surface unevenness detection sensor) disclosed in Japanese Unexamined Patent Application Publication No. 2004-138549, any of various publicly-known methods disclosed in Japanese Unexamined Patent Application Publication No. 2013-061690, or a laser rangefinder. As the moisture amount sensor configured to detect a moisture amount of a road surface, for example, any of various publicly-known moisture-amount detection sensor may be applied. Non-limiting examples of such a publicly-known moisture-amount detection sensor may include the one disclosed in Japanese Unexamined Patent Application Publication No. 2006-046936.

In one example, the surrounding environment sensor 31 of the example embodiment may also include front imaging cameras 31LF and 31RF, a rear imaging camera 31R, and a light detection and ranging (LiDAR) 31S.

The front imaging cameras 31LF and 31RF, the rear imaging camera 31R, and the LiDAR 31S may serve as a surrounding environment sensor adapted to acquiring information regarding a surrounding environment of the vehicle 200. The front imaging cameras 31LF and 31RF may perform imaging of a region in front of the vehicle 200 to generate image data. The rear imaging camera 31R may perform imaging of a region in rear of the vehicle 200 to generate image data. The front imaging cameras 31LF and 31RF and the rear imaging camera 31R may each include an imaging sensor, such as a charged-coupled device (CCD) or a complementary metal-oxide-semiconductor (CMOS), and transmit the generated image data to the road-surface state determination apparatus 100.

In the vehicle 200 illustrated in FIG. 1, the front imaging cameras 31LF and 31RF may be configured as a stereo camera including a pair of left and right cameras, and the rear imaging camera 31R may be configured as a so-called monocular camera. However, the front imaging cameras 31LF and 31RF and the rear imaging camera 31R may each be either a stereo camera or a monocular camera. In addition to the front imaging cameras 31LF and 31RF and the rear imaging camera 31R, the vehicle 200 may further include, for example, a publicly-known camera that is provided on a side-view mirror to perform imaging of a left-rear region or a right-rear region.

The LiDAR 31S may output an optical wave and receive a reflected wave of the outputted optical wave, and detect an object and a distance to the object on the basis of a time from output of the optical wave to reception of the reflected wave. The LiDAR 31S may be configured to transmit detection data to the road-surface state determination apparatus 100. In place of the LiDAR 31S or together with the LiDAR 31S, the vehicle 200 may include one or more of publicly-known sensors including radar sensors and ultrasonic sensors as the surrounding environment sensor 31 adapted to acquiring the information regarding the surrounding environment. Non-limiting examples of the radar sensors may include millimeter-wave radars.

The light reception sensor 32 may be configured to receive three near-infrared lights having respective wavelengths that have been emitted from the light source 47 and reflected by the road surface. The light source 47 may emit the three near-infrared lights having respective wavelengths as with those disclosed in JP-A No. 2006-046936. Such a light reception sensor 32 is not particularly limited as long as it is able to receive the above-described near-infrared lights, and may include any of various publicly-known sensors. Note that the light source 47 may include, for example, a publicly-known light-emitting diode or a publicly-known semiconductor laser device configured to emit the above-described near-infrared lights having the respective wavelengths.

Figure 4:
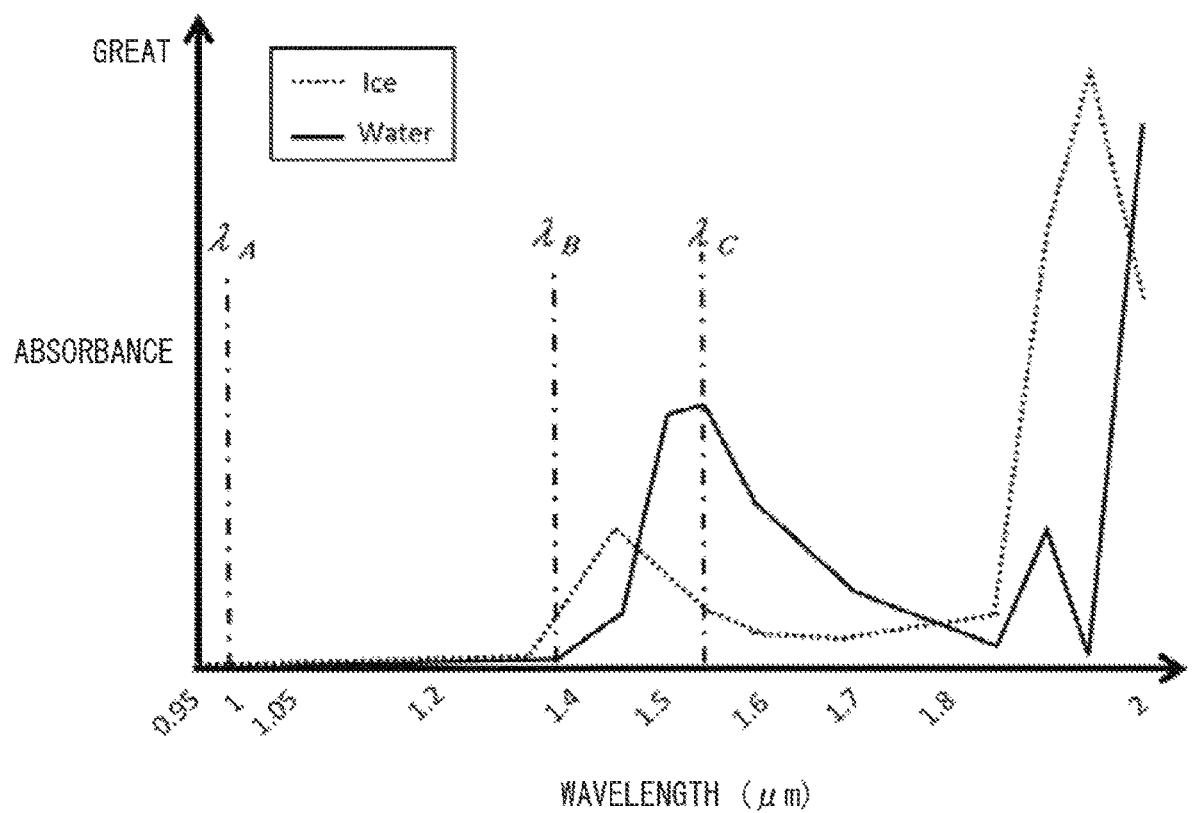
FIG. 4 is a graph illustrating absorbance of ice and water with respect to three near-infrared lights to be used in one example embodiment.

As illustrated in FIG. 4 as an example, the near-infrared lights emitted from the light source 47 may have the following respective wavelengths: a first wavelength $\lambda_A$ less influenced by moisture; a second wavelength $\lambda_B$ that is not easily absorbed by ice and is easily absorbed by water, i.e., that is more greatly influenced by moisture and less influenced by ice; and a third wavelength $\lambda_C$ that is easily absorbed by ice and not easily absorbed by water, i.e., that is less influenced by water and more greatly influenced by ice. For example, the first wavelength $\lambda_A$ may be 980 nm, the second wavelength $\lambda_B$ may be selected within a range from 1370 nm to 1450 nm both inclusive, and the third wavelength $\lambda_C$ may be selected within a range from 1470 nm to 1550 nm both inclusive.

The at least three near-infrared lights having the respective wavelengths may be applied from the light source 47 onto the road surface at any timing, for example, at a timing disclosed in JP-A No. 2006-046936.

The occupant monitoring sensor 33 may include an in-vehicle imaging camera 33c. The in-vehicle imaging camera 33c may include one or more publicly-known sensors detecting information regarding the driver who drives the vehicle 200. The in-vehicle imaging camera 33c may include an imaging device such as a CCD or a CMOS, and perform imaging of an inside of the vehicle 200 to generate image data. The in-vehicle imaging camera 33c may be configured to transmit the generated image data to the road-surface state determination apparatus 100. In the example embodiment, the in-vehicle imaging camera 33c may be so disposed as to perform imaging of the driver who drives the vehicle 200. The provided in-vehicle imaging camera 33c may be only one in number, or may be two or more in number.

The biosensor 34 may be configured to detect biometric information of the driver and transmit detection data to the road-surface state determination apparatus 100. As the biosensor 34, any of various publicly-known sensors may be applicable. For example, the biosensor 34 may include an electric-wave Doppler sensor adapted to detecting a heart rate of the driver, or may be a non-worn pulse sensor adapted to detecting a pulse of the driver. For example, the biosensor 34 may be a pair of electrodes embedded in the steering wheel 13 to measure a heart rate or to obtain an electrocardiogram of the driver.

The vehicle state sensor 35 may include one or more publicly-known sensors that detect an operation state and behavior of the vehicle 200. For example, the vehicle state sensor 35 may include one or more of a steering angle sensor, an accelerator position sensor, a brake stroke sensor, a brake pressure sensor, or an engine speed sensor. The vehicle state sensor 35 may thus detect the operation state of the vehicle 200 such as the steering angle of the steering wheel 13 or the steered wheels, an accelerator position, a brake operation amount, or an engine speed. For example, the vehicle state sensor 35 may include one or more of a vehicle speed sensor, an acceleration rate sensor, or an angular velocity sensor. The vehicle state sensor 35 may thus detect the behavior of the vehicle 200 such as a vehicle speed, a longitudinal acceleration rate, a lateral acceleration rate, or a yaw rate. The vehicle state sensor 35 may also include a sensor detecting an operation performed on a turn signal lamp and detect an operation state of the turn signal lamp. The vehicle state sensor 35 may also include a sensor detecting an inclination state of the vehicle 200 and detect an inclination state of a road. The vehicle state sensor 35 may transmit a sensor signal including the detected information to the road-surface state determination apparatus 100.

The vehicle-to-vehicle communication unit 39 may be an interface adapted to performing communication with another vehicle traveling around the vehicle 200.

The navigation system 40 may be a publicly-known navigation system that sets a traveling route to a destination set by an occupant and notifies the driver of the set traveling route. Coupled to the navigation system 40 may be the GPS sensor 37. The navigation system 40 may receive satellite signals from GPS satellites via the GPS sensor 37 to acquire position information of the vehicle 200 on map data. In place of the GPS sensor 37, an antenna may be provided to receive satellite signals from another satellite system that identifies a position of the vehicle 200.

The HMI 43 may be driven by the road-surface state determination apparatus 100 to present various pieces of information to the driver by, for example, displaying an image or outputting sound. The HMI 43 may include, for example, a display provided in an instrument panel and a speaker provided in the vehicle 200. For example, the display may serve as a display of the navigation system 40. The HMI 43 may include a head-up display that displays an image on a front window of the vehicle 200.

[Road-Surface State Determination Apparatus 100]

Next, described is a configuration example of the road-surface state determination apparatus 100 according to the example embodiment. The road-surface state determination apparatus 100 may determine a road-surface state (type) for the traveling vehicle 200.

Figure 2:
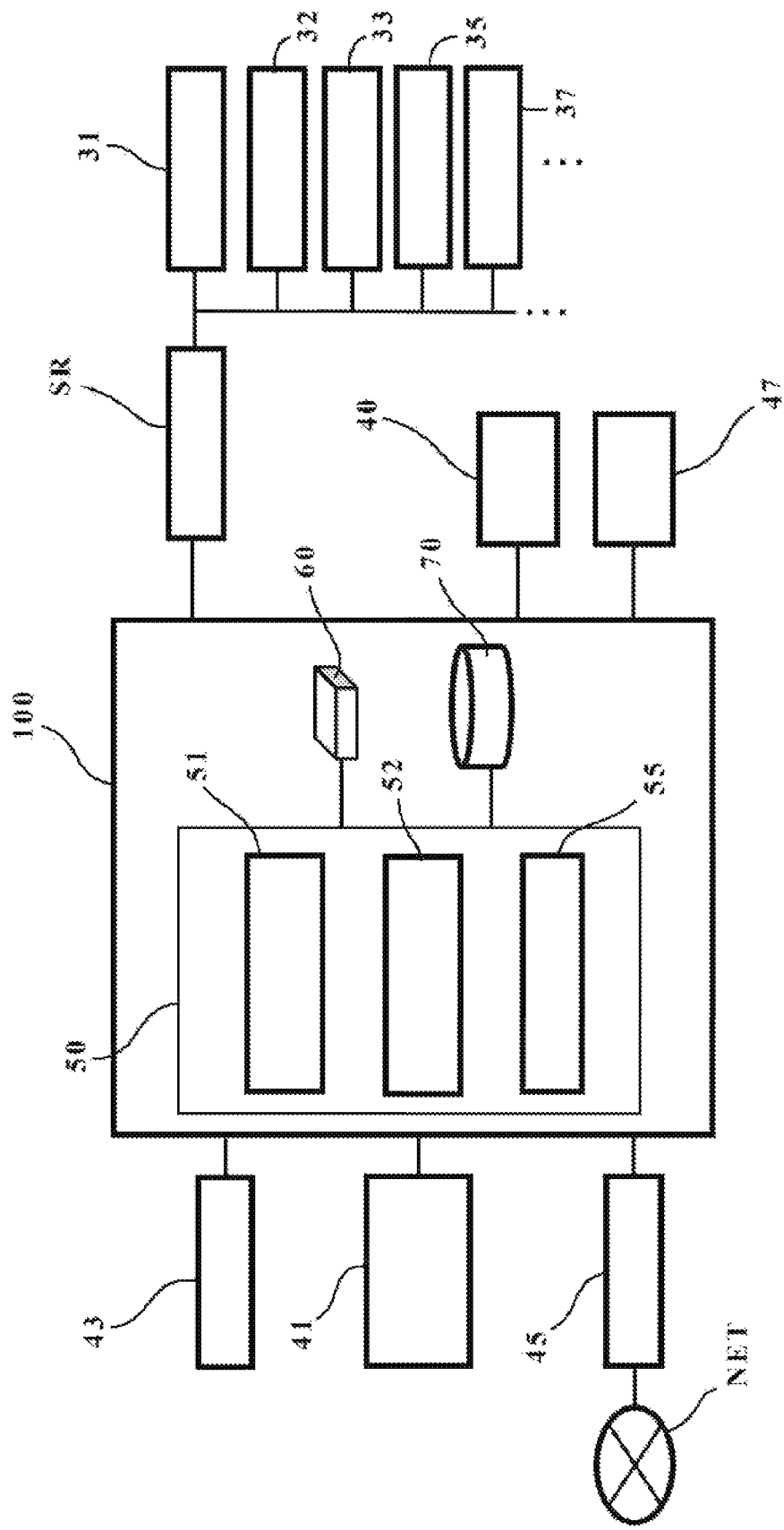
FIG. 2 is a block diagram illustrating a configuration example of the road-surface state determination apparatus and peripheral apparatuses.

FIG. 2 is a block diagram illustrating the configuration example of the road-surface state determination apparatus 100 according to the example embodiment.

Sensors SR may be coupled to the road-surface state determination apparatus 100 via a dedicated line or a communication system such as a controller area network (CAN) or a local inter net (LIN). The sensors SR may include, for example, the surrounding environment sensor 31, the occupant monitoring sensor 33, the biosensor 34, the vehicle state sensor 35, and the GPS sensor 37. The vehicle-to-vehicle communication unit 39, the navigation system 40, the vehicle control apparatus 41, and the HMI 43 described above may also be coupled to the road-surface state determination apparatus 100 via a dedicated line or a communication system such as a CAN or a LIN. The road-surface state determination apparatus 100 may be connectable to an external network NET such as the Internet via a publicly-known communication system 45.

Such a road-surface state determination apparatus 100 according to the example embodiment may include a controller 50 and a publicly-known storage including a memory 60 and a database 70. The controller 50 may include one or more processors. Non-limiting examples of the one or more processors may include a central processing unit (CPU) or CPUs. The controller 50 may partially or entirely be updatable software such as firmware, or a program module to be executed in accordance with a command given from the CPU or the CPUs, for example. The memory 60 of the storage may include a publicly-known memory device such as a random-access memory (RAM) or a read-only memory (ROM).

The database 70 of the storage may include a publicly-known rewritable recording medium such as a solid state drive (SSD), a hard disk drive (HDD), an USB flash, or a storage device. Note that the storage is not particularly limited in number or kind in the example embodiment. At least a portion of information in the database 70 may be stored in a publicly-known external server. In one example, the storage of the example embodiment may hold a computer program to be executed by the controller 50, various parameters to be used in a calculation process, detection data, and information such as a calculation result.

The database 70 of the example embodiment may include, for example, first threshold data FTD regarding a Euclidean distance (a radius) to be used in determination of an snow accumulated (SNOW) state in a polar coordinates system; second threshold data STD regarding polar coordinates ($\theta$) to be used in determination of a freezing (ICE) state in the polar coordinates system; and third threshold data TTD regarding a moisture index to be used in determination of a dry (DRY) state or a wet (WET) state in a polar coordinates system. Hereinafter, the snow accumulated (SNOW) state, the freezing (ICE) state, the dry (DRY) state, and the wet (WET) state are sometimes simply referred to as the SNOW state, the ICE state, the DRY state, and the WET state, respectively.

As illustrated in FIG. 2, the controller 50 of the example embodiment may include a near-infrared light application and reception unit 51, a road-surface state determination unit 52, and a vehicle control unit 55.

The near-infrared light application and reception unit 51 may be configured to control the light source 47 configured to emit each of the three near-infrared lights having the respective wavelengths different from one another and thereby cause the three near-infrared lights to be applied from the light source 47 onto a road surface on which the vehicle 200 travels. In addition, the near-infrared light application and reception unit 51 may be configured to receive the three near-infrared lights that have been emitted from the light source 47 and reflected by the above-described road surface by means of an unillustrated publicly-known light reception unit. That is, the controller 50 may control the light source 47 configured to emit each of the three near-infrared lights having the respective wavelengths different from one another and thereby cause the three near-infrared lights to be applied from the light source 47 onto the road surface on which the vehicle 200 travels. The controller 50 may cause the near-infrared light application and reception unit 51 to receive the three near-infrared lights reflected by the road surface.

The road-surface state determination unit 52 may be configured to determine a state of the road surface on which the vehicle 200 travels on the basis of a light reception result obtained by the near-infrared light application and reception unit 51 related to the three near-infrared lights reflected by the road surface. In this case, as will be described later, the road-surface state determination unit 52 may perform primary determination as to whether a type of the road surface is the SNOW state in precedence over other types, and after the primary determination, perform secondary determination as to which one of the other types (DRY, ICE, and WET) the type of the road surface is. Further, upon performing the secondary determination, the road-surface state determination unit 52 may determine whether the type of the road surface is the ICE state in precedence, and thereafter determine whether the type of the road surface is the DRY state or the WET state.

Figure 5:
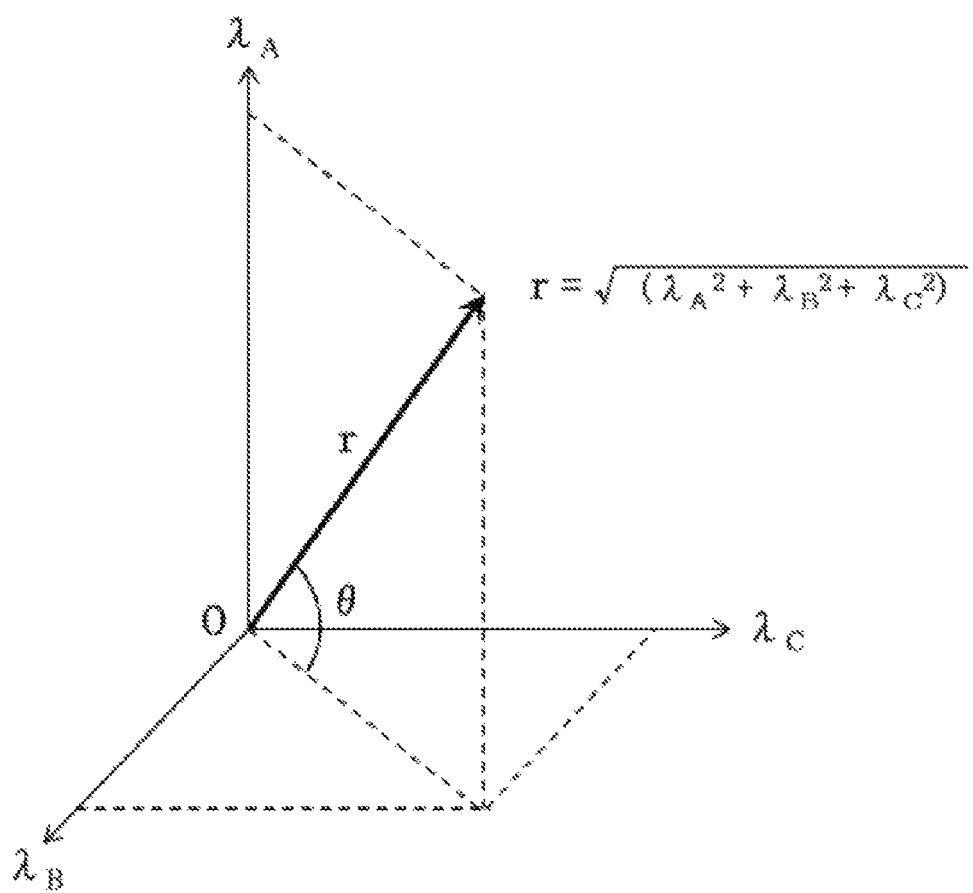
FIG. 5 is a schematic diagram illustrating an example of polar coordinates data to be used in one example embodiment.

As illustrated in FIG. 5, the road-surface state determination unit 52 may be configured to determine the state of the road surface from a determination threshold based on a polar coordinates system having axes that represent the respective wavelengths of the three near-infrared lights on the basis of respective amounts of the three near-infrared lights that have been reflected by the road surface and received by the near-infrared light application and reception unit 51. In the polar coordinates system illustrated in FIG. 5, the amount of the received near-infrared light having the wavelength represented by each of the axes may be represented by a value converted into a voltage, for example, within a range from several milli volts to several thousand millivolts.

On the basis of a consideration effort by the inventor, it is concluded that, in the example embodiment, a contribution to improvement of accuracy may be made by setting a determination threshold for determining each of the states of the road surface on the basis of features exhibited by the near-infrared lights having the respective wavelengths on the road surface as listed in Table 1. The states of the road surface may include, for example, the SNOW state, the ICE state, the DRY state, and the WET state.

TABLE 1

| | Feature of near-infrared lights on each road surface | Ratio between amounts of received near-infrared lights |
|---|---|---|
| DRY | A diffused light component increases due to unevenness of the road surface. Hardly absorbed by moisture. | Wavelength $\lambda_A$:medium<br>Wavelength $\lambda_B$:medium<br>Wavelength $\lambda_C$:medium |
| WET | A regular reflection component increases and amounts of received lights decrease due to a water film. Absorbed by moisture. | Wavelength $\lambda_A$:medium<br>Wavelength $\lambda_B$:small to medium<br>Wavelength $\lambda_C$:small |
| SNOW | Amounts of received lights are great due to a great amount of the diffused light component. | Wavelength $\lambda_A$:medium<br>Wavelength $\lambda_B$:medium to large<br>Wavelength $\lambda_C$:small |
| ICE | The diffused light component is present, but a long wavelength component (wavelengths $\lambda_B$ and $\lambda_C$) is absorbed greatly by water and ice. | Wavelength $\lambda_A$:medium<br>Wavelength $\lambda_B$:small<br>Wavelength $\lambda_C$:small |

For example, evaluation for the DRY state may be: that a diffused light component increases because the unevenness of the road surface is more outstanding than in other states; and that the near-infrared lights are hardly absorbed by moisture on the road surface. Evaluation for the WET state may be: that a regular reflection component of the near-infrared lights increases while amounts of received lights decrease due to a water film formed on the road surface; and that the near-infrared lights are absorbed by moisture on the road surface.

Evaluation for the SNOW state may be that the amounts of the received lights relatively increase because the near-infrared lights are diffused more greatly than in other states, for example, under an influence of snowflakes. Evaluation for the ICE state may be that the component on the long wavelength side is greatly absorbed by water and ice although the diffused light component is present.

Accordingly, first, upon the primary determination, the road-surface state determination unit 52 of the example embodiment may include the respective amounts of the three near-infrared lights received by the light reception sensor 32 in Expression (1) for calculating a Euclidean distance (a radius) in the polar coordinates system. In Expression (1), "x(n)" may represent the amount of the received near-infrared light having the wavelength $\lambda_A$, "y(n)" may represent the amount of the received near-infrared light having the wavelength $\lambda_B$, and "z(n)" may represent the amount of the received near-infrared light having the wavelength $\lambda_C$.

$$\gamma(n) = \sqrt{x(n)^2 + y(n)^2 + z(n)^2} \tag{1}$$

Thereafter, upon the secondary determination, the road-surface state determination unit 52 may include the respective amounts of the three near-infrared lights received by the light reception sensor 32 in Expression (2) for calculating polar coordinates (an angle θ(n)) in the polar coordinates system. In Expression (2), "x(n)" may represent the amount of the received near-infrared light having the wavelength $\lambda_A$, "y(n)" may represent the amount of the received near-infrared light having the wavelength $\lambda_B$, and "z(n)" may represent the amount of the received near-infrared light having the wavelength $\lambda_C$.

$$\theta_{(n)} = \arctan\left(\frac{z(n)}{\sqrt{x(n)^2 + y(n)^2}}\right) \tag{2}$$

In one example, the road-surface state determination unit 52 may determine the type of the road surface on which the vehicle 200 travels with use of a moisture index MI. The moisture index MI may represent a ratio of an amount of reception of light having a wavelength more easily absorbed by water to an amount of reception of light having a wavelength less easily absorbed by water. For example, regarding the three near-infrared lights described above, the moisture index MI may be a ratio of an amount $RA_1$ of the received near-infrared light having the wavelength more easily absorbed by water, i.e., the second wavelength $\lambda_B$ to an amount $RA_2$ of the received near-infrared light having the wavelength less easily absorbed by water, i.e., the first wavelength $\lambda_A$. The road-surface state determination unit 52 may use this moisture index MI to determine whether the type of the road surface is the DRY state or the WET state. This moisture index MI may be expressed by the following Expression (3).

$$MI = \frac{RA_2}{RA_1} \tag{3}$$

The vehicle control unit 55 may be configured to control the vehicle 200 on the basis of the road-surface state determined by the road-surface state determination unit 52. Non-limiting examples of such a vehicle control based on the road-surface state may include a control of drawing attention of an occupant by means of the HMI 43, or a control of adjusting the driving torque of the vehicle 200 in accordance with the road-surface state by means of the vehicle control apparatus 41.

[Method of Determining State of Road Surface to Travel]

Figure 3:
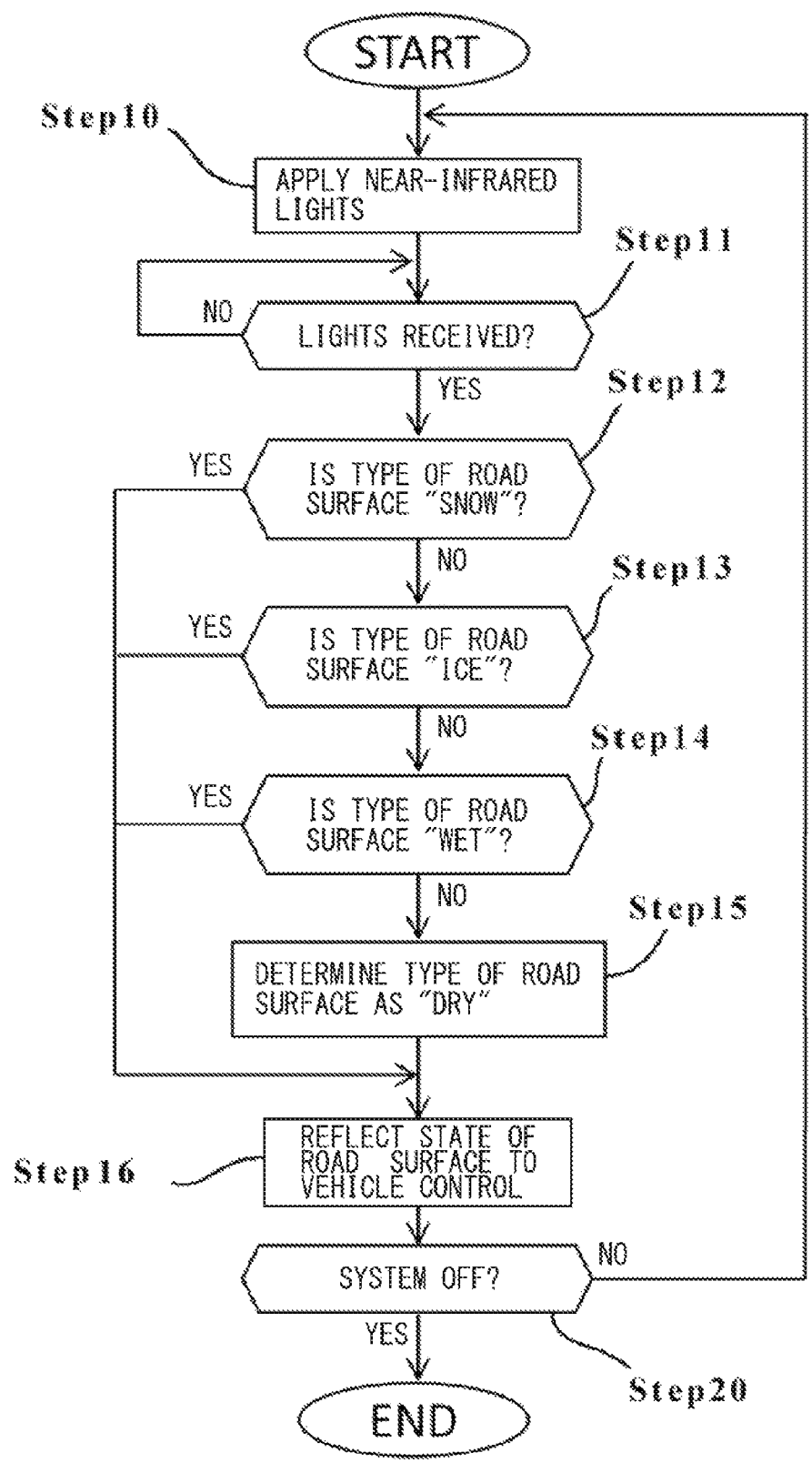
FIG. 3 is a flowchart illustrating a road-surface state determination method to be executed by the road-surface state determination apparatus of one example embodiment.

Next, referring to FIG. 3, described is a method of determining the state of the road surface on which the vehicle 200 travels in the example embodiment. Described below is an example of determining which of the above-described four road-surface states, i.e., the DRY state, the WET state, the SNOW state, and the ICE state, the surface of the road surface belongs to. However, these road-surface states are mere examples of publicly-known road-surface states. Accordingly, for example, any other publicly-known road-surface state such as a snow compacted state may be applied as long as the state of the road surface is determinable with use of the amounts of the received three near-infrared lights. Upon the determination of the state of the road surface in the example embodiment, a state including a combination of two or more of the road-surface states, e.g., a state including a combination of the SNOW state and the WET state, may be determined.

The following method of determining the state of the road surface may be executed by the road-surface state determination apparatus 100 in a non-contact manner.

First, in Step 10, the near-infrared light application and reception unit 51 may control the light source 47 and thereby apply each of the three near-infrared lights having the respective wavelengths different from one another onto the road surface.

Thereafter, in Step 11, the near-infrared light application and reception unit 51 may determine whether each of the three near-infrared lights reflected by the road surface has been received by means of the light reception sensor 32.

In a case where it is determined that the three near-infrared lights have been received in Step 11 (Step 11: YES), the road-surface state determination unit 52 may first determine whether the type of the road surface is the "SNOW state" in Step 12. In other words, the road-surface state determination unit 52 may perform the primary determination as to whether the type of the road surface is the SNOW state in precedence over other types on the basis of the three near-infrared lights that have been reflected by the road surface and received by the light reception sensor 32. In a case where it is not determined that the three near-infrared lights have been received in Step 11 (Step 11: NO), the road-surface state determination unit 52 may be put on standby.

For example, the road-surface state determination unit 52 may perform the primary determination by including the respective amounts of the three near-infrared lights received by the light reception sensor 32 in Expression (1) for calculating the Euclidean distance (the radius) in the polar coordinates system illustrated in FIG. 5.

Figure 6:
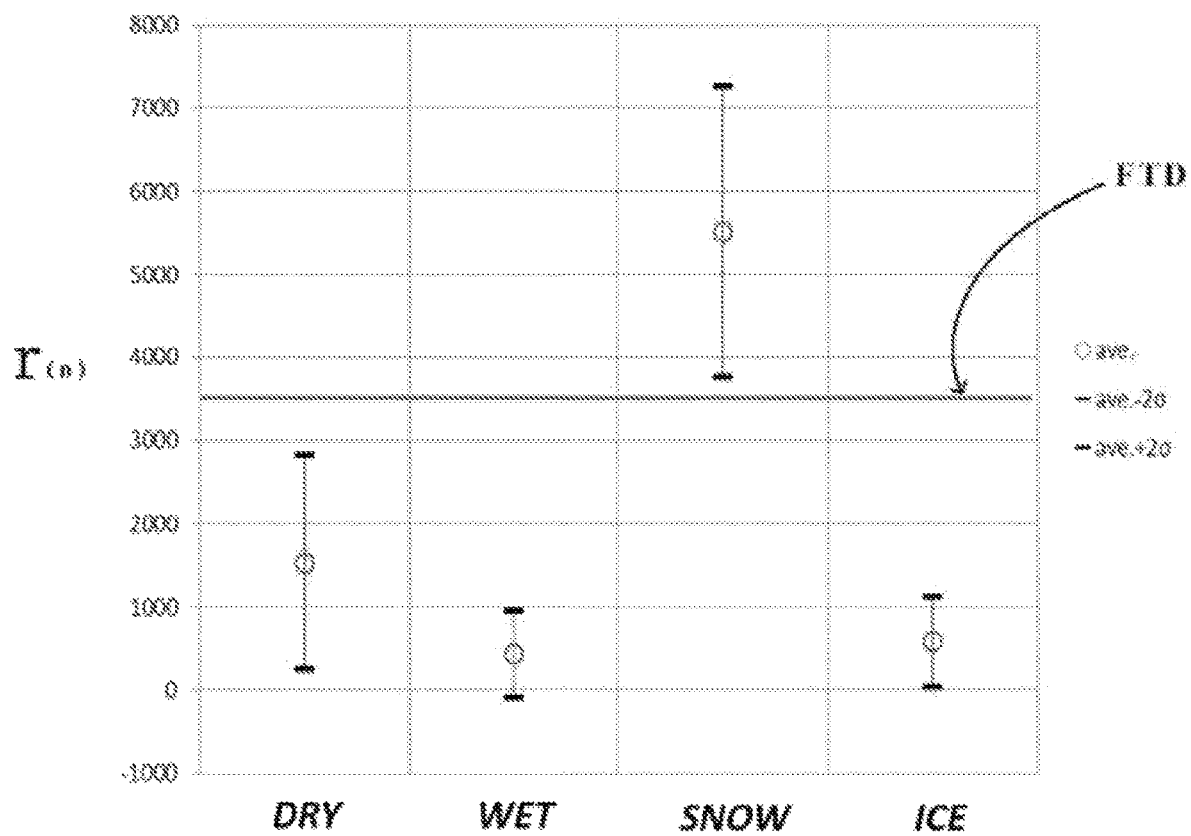
FIG. 6 is a schematic diagram illustrating an example of a result of calculation of a Euclidean distance (a radius) in a polar coordinates system applicable to determination of a snow accumulated (SNOW) state.

In this case, the road-surface state determination unit 52 may determine whether the r(n) calculated with Expression (1) exceeds the first threshold data FTD on the basis of the first threshold data FTD that allows for distinction between the SNOW state and the rest of the road-surface states as illustrated in FIG. 6.

The first threshold data FTD may be calculated in advance, for example, by an experiment or a simulation, and may be stored, for example, in the database 70. In this non-limiting example, an average value for each state may be calculated on the basis of an experiment, etc., and the first threshold data FTD may be set on the basis of a range of the average value ±2σ.

In a case where the r(n) calculated in Step 12 exceeds the first threshold data FTD, the road-surface state determination unit 52 may determine the state of the road surface as the "SNOW state" (Step 12: YES), and the process may move to Step 16.

In contrast, in a case where the r(n) calculated in Step 12 does not exceed the first threshold data FTD (Step 12: NO), the road-surface state determination unit 52 may perform the secondary determination as to which of the types other than the SNOW state the type of the road surface is in Step 13 thereafter.

For example, upon the secondary determination, the road-surface state determination unit 52 may first determine whether the type of the road surface is the ICE state by including the respective amounts of the three near-infrared lights received by the light reception sensor 32 in Expression (2) for calculating the polar coordinates (the angle θ) in the polar coordinates system illustrated in FIG. 5.

Figure 7:
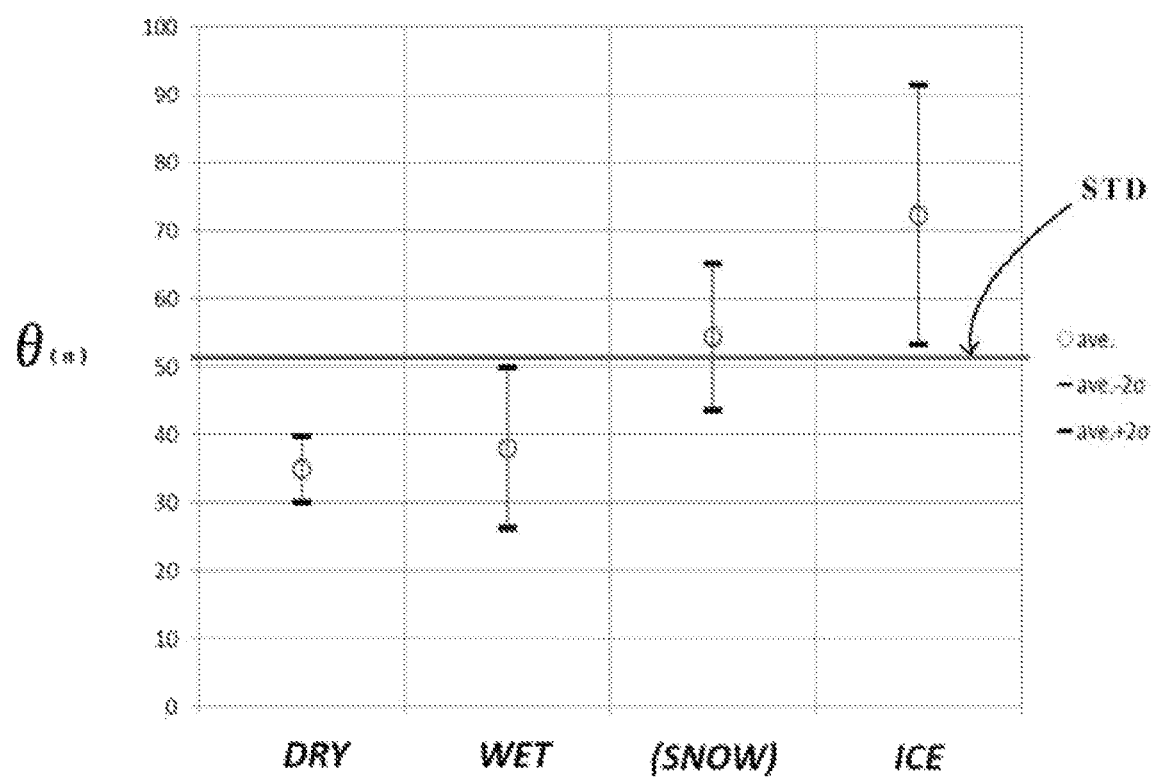
FIG. 7 is a schematic diagram illustrating an example of a result of calculation of polar coordinates ($\theta$) in a polar coordinates system applicable to determination of a freezing (ICE) state.

In this case, the road-surface state determination unit 52 may determine whether the angle θ(n) calculated with Expression (2) exceeds the second threshold data STD on the basis of the second threshold data STD that allows for distinction between the ICE state and the rest of the road-surface states, i.e., the DRY state and the WET state, as illustrated in FIG. 7.

The second threshold data STD may be calculated in advance, for example, by an experiment or a simulation, and may be stored, for example, in the database 70. In this non-limiting example, an average value for each state may be calculated on the basis of an experiment, etc., and angle information which is the above-described threshold may be set on the basis of a range of the average value ±2σ.

In a case where the θ(n) calculated in Step 13 exceeds the second threshold data STD, the road-surface state determination unit 52 may determine the state of the road surface as the "ICE state" (Step 13: YES), and the process may move to Step 16.

In contrast, in a case where the θ(n) calculated in Step 13 does not exceed the second threshold data STD (Step 13: NO), the road-surface state determination unit 52 may perform the secondary determination as to whether the type of the road surface is the DRY state or the WET state in Steps 14 and 15 thereafter. In the example embodiment, the determination as to whether the type of the road surface is the WET state may be performed prior to the determination as to whether the type of the road surface is the DRY state. However, the determination as to whether the type of the road surface is the DRY state may be performed prior to the determination as to whether the type of the road surface is the WET state, or they may be performed substantially at the same timing.

Figure 8:
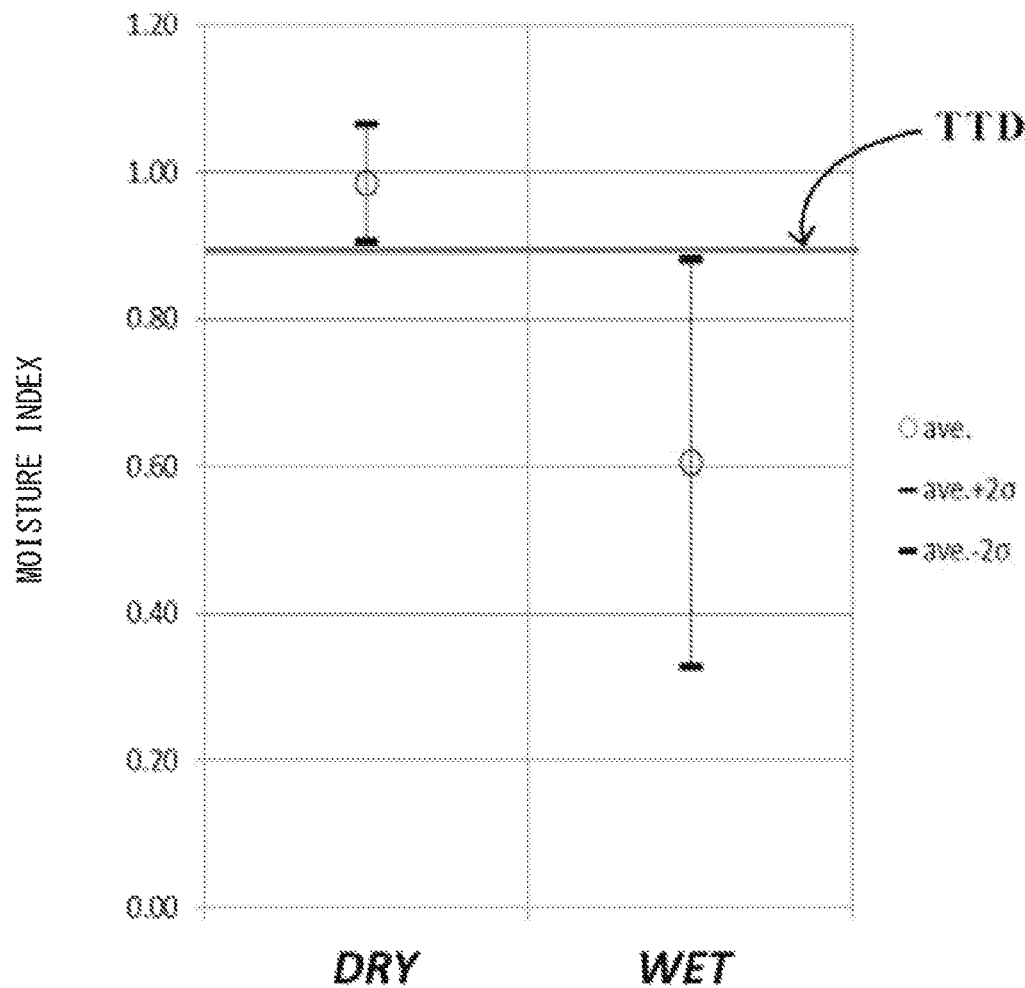
FIG. 8 is a schematic diagram illustrating an example of a moisture index and a determination threshold for determination regarding a dry (DRY) state and a (WET) state.

In the example embodiment, the road-surface state determination unit 52 may determine whether the type of the road surface is the WET state or the DRY state with use of the moisture index MI in Steps 14 and 15. In this case, the road-surface state determination unit 52 may determine whether the moisture index MI calculated with Expression (3) exceeds (or falls below) the third threshold data TTD on the basis of the third threshold data TTD that allows for distinction between the DRY state and the WET state, as illustrated in FIG. 8.

The third threshold data TTD may be calculated in advance, for example, by an experiment or a simulation, and may be stored, for example, in the database 70. In this non-limiting example, an average value for each state may be calculated on the basis of an experiment, etc., and a threshold of the moisture index MI described above may be set on the basis of a range of the average value ±2σ.

In a case where the calculated moisture index MI exceeds the third threshold data TTD, the road-surface state determination unit 52 may determine the state of the road surface as the "DRY state" (Step 14: NO). In a case where the calculated moisture index MI does not exceed the third threshold data TTD, the road-surface state determination unit 52 may determine the state of the road surface as the "WET state" (Step 14: YES).

As described above, in one example, upon the secondary determination, the road-surface state determination unit 52 may determine whether the type of the road surface is the ICE state in precedence, and thereafter determine whether the type of the road surface is the DRY state or the WET state.

After the state of the road surface to travel is thus determined, in Step 16, the determined state of the road surface may be reflected to the vehicle control for the traveling vehicle 200. For example, the vehicle control apparatus 41 may perform a control of adjusting the driving torque of the vehicle 200 on the basis of the state of the road surface determined with higher accuracy.

Thereafter, in Step 20, whether the system of the vehicle 200 has stopped may be determined. For example, if the system is determined as being OFF (Step 20: YES), the process may be ended. If the vehicle 200 is still traveling (Step 20: NO), the process may be returned to Step 10 and the above-described process may be repeated. Accordingly, for example, in a case where it changes from rainy to sunny while the vehicle 200 is traveling, the road-surface state determination apparatus 100 may newly determine the road-surface state.

According to the road-surface state determination apparatus 100 for the vehicle 200 and the method of determining a state of a road surface of the example embodiment described above, it is possible to accurately determine the state of the road surface on which the vehicle 200 travels in accordance with various traveling environments. According to the example embodiment, whether the road surface is slippery, i.e., whether the state of the road surface is the SNOW state or the ICE state, may be determined in precedence over other points. This suppresses the driving force of the vehicle even if erroneous determination is made, therefore making it possible to further improve the traveling safety.

In the above description, some example embodiments of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, regarding each of the first threshold data FTD, the second threshold data STD, and the third threshold data TTD in the example embodiment, there may be an optimal threshold depending on the region. Therefore, for example, the road-surface state determination apparatus 100 may determine the state of the road surface on the basis of threshold data for the corresponding one of predetermined divisional regions, such as prefectures or areas, on the basis of the position information of the vehicle 200 obtained from the GPS sensor 37.

In the example embodiment described above, after the state of the road surface is determined as the SNOW state in Step 12, the process may move to Step 16. However, the embodiment of the technology is not limited to this example. For example, the following additional determination process may be provided between Step 12 and Step 16.

The SNOW state may be similar to a state of "concrete" or of a "lane line" in that the road surface has the color of white. Therefore, distinction between the SNOW state and the above-described states may also be made.

For example, in such an additional determination process, the moisture index MI may be calculated and the calculated moisture index MI may be compared with a predetermined threshold to thereby determine whether the state of the road surface is the "SNOW state" or the "concrete or lane line state". If the moisture index MI in preliminarily determining the state of the road surface as the SNOW state indicates a moisture amount of a predetermined amount or greater, the state of the road surface may be finally determined as the "SNOW state" in the additional determination process. As with other thresholds, the threshold to be used in the additional determination process may be calculated in advance, for example, by an experiment or a simulation, and may be stored, for example, in the database 70.

According to one embodiment of the technology, it is possible to accurately determine a state of a road surface in a front region in a traveling direction of a vehicle without erroneous determination while suppressing a cost.

Each of the near-infrared light application and reception unit 51, the road-surface state determination unit 52, and the vehicle control unit 55 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the near-infrared light application and reception unit 51, the road-surface state determination unit 52, and the vehicle control unit 55 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the near-infrared light application and reception unit 51, the road-surface state determination unit 52, and the vehicle control unit 55 illustrated in FIG. 2.

The invention claimed is:

1. A road-surface state determination apparatus configured to perform non-contact determination of a state of a road surface, the road-surface state determination apparatus comprising:
   one or more processors; and
   one or more memories communicably coupled to the one or more processors,
   the one or more processors being configured to:
      control a light source configured to emit each of three near-infrared lights having respective wavelengths different from one another and thereby cause the three near-infrared lights to be applied from the light source onto the road surface;
      cause a light reception sensor to receive the three near-infrared lights reflected by the road surface; and
      determine the state of the road surface from a determination threshold based on a polar coordinates system having axes that represent the respective wavelengths of the three near-infrared lights received by the light reception sensor,
   wherein the one or more processors are configured to include the three near-infrared lights received by the light reception sensor in Expression (1) for calculating a Euclidean distance $\gamma_{(n)}$ that represents a radius in the polar coordinates system, and thereby perform primary determination, $$\gamma(n) = \sqrt{x(n)^2 + y(n)^2 + z(n)^2} \tag{1}$$

where x(n) represents an amount of a received near-infrared light having a wavelength $\lambda_A$ that is less influenced by moisture, $y_{(n)}$ represents an amount of a received near-infrared light having a wavelength $\lambda_B$ that is not easily absorbed by ice and is easily absorbed by water, and z(n) represents an amount of a received near-infrared light having a wavelength $\lambda_C$ that is easily absorbed by ice and not easily absorbed by water.

2. The road-surface state determination apparatus according to claim 1, wherein the one or more processors are configured to include the three near-infrared lights received by the light reception sensor in Expression (2) for calculating polar coordinates that represent an angle $\theta_{(n)}$ in the polar coordinates system, and thereby perform determination related to a freezing state in secondary determination, $$\theta_{(n)} = \arctan\left(\frac{z(n)}{\sqrt{x(n)^2 + y(n)^2}}\right) \quad (2)$$

where x(n) represents an amount of a received near-infrared light having a wavelength $\lambda_A$ that is less influenced by moisture, y(n) represents an amount of a received near-infrared light having a wavelength $\lambda_B$ that is not easily absorbed by ice and is easily absorbed by water, and z(n) represents an amount of a received near-infrared light having a wavelength $\lambda_C$ that is easily absorbed by ice and not easily absorbed by water.

3. A road-surface state determination apparatus configured to perform non-contact determination of a state of a road surface, the road-surface state determination apparatus comprising:
one or more processors; and
one or more memories communicably coupled to the one or more processors, the one or more processors being configured to:
control a light source configured to emit each of three near-infrared lights having respective wavelengths different from one another and thereby cause the three near-infrared lights to be applied from the light source onto the road surface;
cause a light reception sensor to receive the three near-infrared lights reflected by the road surface;
determine the state of the road surface by setting a determination threshold based on a polar coordinates system having axes that represent the wavelengths of the three near-infrared lights received by the light reception sensor;
wherein the one or more processors is further configured to:
perform primary determination to determine only whether the road surface is in a snow accumulated state on a basis of a light reception result obtained by the light reception sensor; and
based on determining that the road surface is not in the snow accumulated state in the primary determination, perform secondary determination to determine the state of the road surface based on the light reception result obtained by the light reception sensor, and
wherein the one or more processors are further configured to include the three near-infrared lights received by the light reception sensor in Expression (1) for calculating a Euclidean distance $\gamma_{(n)}$ that represents a radius in the polar coordinates system, and thereby perform the primary determination, $$\gamma(n) = \sqrt{x(n)^2 + y(n)^2 + z(n)^2} \quad (1)$$

where x(n) represents an amount of a received near-infrared light having a wavelength $\lambda_A$ that is less influenced by moisture, $y_{(n)}$ represents an amount of a received near-infrared light having a wavelength $\lambda_B$ that is not easily absorbed by ice and is easily absorbed by water, and z(n) represents an amount of a received near-infrared light having a wavelength $\lambda_C$ that is easily absorbed by ice and not easily absorbed by water.

4. The road-surface state determination apparatus according to claim 3, wherein the one or more processors are configured to:
in the secondary determination, determine only whether the road surface is in a freezing state; and
in response to determining that the road surface is not in the freezing state in the secondary determination, determine whether the road surface is in a dry state or a wet state.

5. The road-surface state determination apparatus according to claim 4, wherein the one or more processors are configured to include the three near-infrared lights received by the light reception sensor in Expression (2) for calculating polar coordinates that represent an angle $\theta_{(n)}$ in the polar coordinates system, and thereby perform the secondary determination, $$\theta_{(n)} = \arctan\left(\frac{z(n)}{\sqrt{x(n)^2 + y(n)^2}}\right) \quad (2)$$

where x(n) represents an amount of a received near-infrared light having a wavelength $\lambda_A$ that is less influenced by moisture, y(n) represents an amount of a received near-infrared light having a wavelength $\lambda_B$ that is not easily absorbed by ice and is easily absorbed by water, and z(n) represents an amount of a received near-infrared light having a wavelength $\lambda_C$ that is easily absorbed by ice and not easily absorbed by water.

6. A road-surface state determination apparatus configured to perform non-contact determination of a state of a road surface, the road-surface state determination apparatus comprising:
one or more processors; and
one or more memories communicably coupled to the one or more processors,
the one or more processors being configured to:
control a light source configured to emit each of three near-infrared lights having respective wavelengths different from one another and thereby cause the three near-infrared lights to be applied from the light source onto the road surface;
cause a light reception sensor to receive the three near-infrared lights reflected by the road surface; and
determine the state of the road surface from a determination threshold based on a polar coordinates system having axes that represent the respective wavelengths of the three near-infrared lights received by the light reception sensor,
wherein the one or more processors are configured to include the three near-infrared lights received by the light reception sensor in Expression (2) for calculating polar coordinates that represent an angle θ(n) in the polar coordinates system, and thereby perform determination related to a freezing state, $$\theta_{(n)} = \arctan\left(\frac{z(n)}{\sqrt{x(n)^2 + y(n)^2}}\right) \quad (2)$$

where x(n) represents an amount of a received near-infrared light having a wavelength $\lambda_A$ that is less influenced by moisture, y(n) represents an amount of a received near-infrared light having a wavelength $\lambda_B$ that is not easily absorbed by ice and is easily absorbed by water, and z(n) represents an amount of a received near-infrared light having a wavelength $\lambda_C$ that is easily absorbed by ice and not easily absorbed by water.

* * * * *